United States Patent
Xu

(10) Patent No.: US 9,219,842 B1
(45) Date of Patent: Dec. 22, 2015

(54) SYSTEM AND METHOD OF PROVIDING SIDEBAND ADVERTISING

(75) Inventor: Yongyong Xu, Sunnyvale, CA (US)

(73) Assignee: Yongyong Xu, Sunnyvale, CA (US)

( * ) Notice: Subject to any disclaimer, the term of this patent is extended or adjusted under 35 U.S.C. 154(b) by 1600 days.

(21) Appl. No.: 11/512,977

(22) Filed: Aug. 30, 2006

Related U.S. Application Data

(60) Provisional application No. 60/596,082, filed on Aug. 30, 2005.

(51) Int. Cl.
*G06F 17/00* (2006.01)
*H04N 1/32* (2006.01)
*G06F 17/30* (2006.01)

(52) U.S. Cl.
CPC ........ *H04N 1/32144* (2013.01); *G06F 17/3089* (2013.01)

(58) Field of Classification Search
CPC .................. H04N 1/32144; G06F 17/3089
USPC ................... 715/255, 234, 200, 243
See application file for complete search history.

(56) References Cited

U.S. PATENT DOCUMENTS

| 6,205,432 B1* | 3/2001 | Gabbard et al. ............... 705/14 |
| 6,587,599 B1* | 7/2003 | Huang ........................ 382/284 |
| 2001/0049701 A1* | 12/2001 | Howerton et al. ............ 707/513 |
| 2002/0026362 A1* | 2/2002 | Tanaka ........................ 705/14 |
| 2003/0040957 A1* | 2/2003 | Rodriguez et al. ............ 705/14 |
| 2003/0103230 A1* | 6/2003 | Flannery ..................... 358/1.14 |
| 2004/0078304 A1* | 4/2004 | Gabbard et al. ............... 705/27 |

OTHER PUBLICATIONS

Joe Burns, Style Sheets and Backgrounds, Feb. 23, 2005, HTML Goodies, pp. 1-5.*

* cited by examiner

*Primary Examiner* — Manglesh M Patel

(57) ABSTRACT

A system and method of embedding a sideband content, including sideband advertising, in a main content is disclosed. The method includes the steps of preparing the main content, preparing the sideband content, and merging the sideband content in the main content such that the sideband content is embedded non-intrusively in the main content. The sideband content may include a watermark, mosaic image or text pattern. Sideband content may be embedded in media content including print media content, online content such as web pages, streaming media content such as radio, television, and video transmissions, and mobile media content.

18 Claims, 6 Drawing Sheets

GNU GENERAL PUBLIC LICENSE
Version 2, June 1991

Copyright (C) 1989, 1991 Free Software Foundation, Inc.
51 Franklin St, Fifth Floor, Boston, MA 02110-1301 USA
Everyone is permitted to copy and distribute verbatim copies
of this license document, but changing it is not allowed.

— 100

The licenses for most software are designed to take away your
freedom to share and change it. By contrast, the GNU General Public
License is intended to guarantee your freedom to share and change free
software--to make sure the software is free for all its users. This
General Public License applies to most of the Free Software
Foundation's software and to any other program whose authors commit to
using it. (Some other Free Software Foundation software is covered by
the GNU Library General Public License instead.) You can apply it to
your programs, too.

— 110

When we speak of free software, we are referring to freedom, not
price. Our General Public Licenses are designed to make sure that you
have the freedom to distribute copies of free software (and charge for
this service if you wish), that you receive source code or can get it
if you want it, that you can change the software or use pieces of it
in new free programs; and that you know you can do these things.

To protect your rights, we need to make restrictions that forbid
anyone to deny you these rights or to ask you to surrender the rights.
These restrictions translate to certain responsibilities for you if you
distribute copies of the software, or if you modify it.

For example, if you distribute copies of such a program, whether
gratis or for a fee, you must give the recipients all the rights that
you have. You must make sure that they, too, receive or can get the
source code. And you must show them these terms so they know their
rights.

We protect your rights with two steps: (1) copyright the software, and
(2) offer you this license which gives you legal permission to copy,
distribute and/or modify the software.

Also, for each author's protection and ours, we want to make certain
that everyone understands that there is no warranty for this free
software. If the software is modified by someone else and passed on, we
want its recipients to know that what they have is not the original, so
that any problems introduced by others will not reflect on the original
authors' reputations.

Finally, any free program is threatened constantly by software
patents. We wish to avoid the danger that redistributors of a free
program will individually obtain patent licenses, in effect making the
program proprietary. To prevent this, we have made it clear that any
patent must be licensed for everyone's free use or not licensed at all.

Fig. 1

GNU GENERAL PUBLIC LICENSE
                Version 2, June 1991

Copyright (C) 1989, 1991 Free Software Foundation, Inc.
 51 Franklin St, Fifth Floor, Boston, MA  02110-1301  USA         200
 Everyone is permitted to copy and distribute verbatim copies
 of this license document, but changing it is not allowed.

Preamble
                                                                  210
   The licenses for most software are designed to take away your
 freedom to share and change it.  By contrast, the GNU General Public
 License is intended to guarantee your freedom to share and change free
 software--to make sure the software is free for all its users.  This
 General Public License applies to most of the Free Software
 Foundation's software and to any other program whose authors commit to
 using it.  (Some other Free Software Foundation software is covered by
 the GNU Library General Public License instead.)  You can apply it to
 your programs, too.

```
               GNU GENERAL PUBLIC LICENSE                    Version 2,
June 1991   Copyright (C) 1989, 1991 Free Software Foundation, Inc.  51
Franklin St, Fifth Floor, Boston, MA  02110-1301  USA  Everyone is
permitted to copy and distribute verbatim copies  of this license
document, but                                                changing
it is not                                                    allowed.

Preamble                              The
licenses for most software are        designed to take away your freedom
to share and change it.  By           contrast, the GNU General Public
License is intended to guarantee      your freedom to share and change
free software to make sure the        software is free for all its users.
This General Public License           applies to most of the Free
Software Foundation's software        and to any other program whose
authors commit to using it.           (Some other Free Software
Foundation software is covered        by the GNU Library General Public
License instead.)  You can apply      it to your programs, too.  When
we speak of free software, we         are referring to freedom, not
price.  Our General Public            Licenses are designed to make sure
that you have the freedom to          distribute copies of free software
(and charge for this service if       you wish), that you receive source
code or can get it if you want        it, that you can change the
software or use pieces of it in       new free programs; and that you
know you can do these things.         To protect your rights, we need to
make restrictions that forbid         anyone to deny you these rights or
```

Fig.5

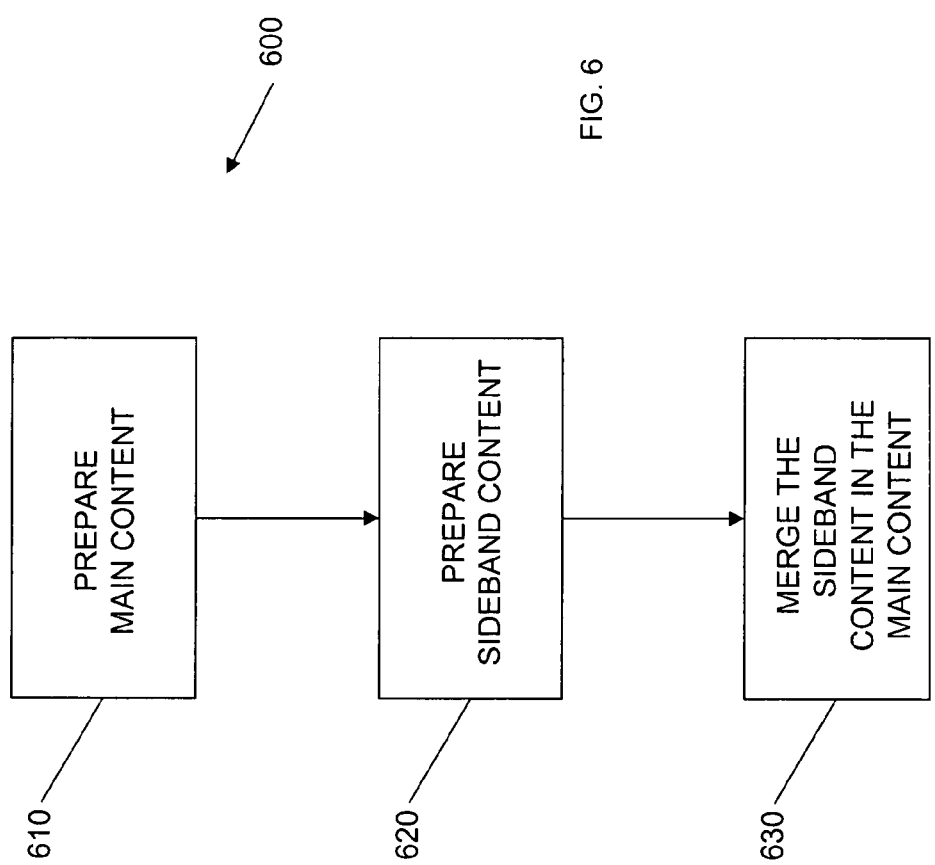

SYSTEM AND METHOD OF PROVIDING SIDEBAND ADVERTISING

CROSS REFERENCE TO RELATED APPLICATIONS

The present invention is related to Provisional Application Ser. No. 60/596,082, filed on Aug. 30, 2005 entitled "Methods of Sideband Advertisement", the entire disclosure of which is herein incorporated by reference.

BACKGROUND OF THE INVENTION

The present invention relates generally to advertising techniques and more particularly to a system and method of providing sideband advertising that non-intrusively embeds sideband content into a main content.

Advertisement has been one of the most important revenue sources for all kinds of media. From conventional media such as newspapers to multimedia such as television, from web pages to streaming media, advertisements are everywhere.

Among the purposes of advertisements are to ensure that the content of the advertisements are remembered by readers and viewers, and to get the attention of readers and viewers, or at least, have the readers and viewers notice the existence of the advertisements. The more frequently an advertisement occurs, the higher the degree of attention paid to it by viewers. However, many viewers don't like to read or view advertisement pages having only advertisements, and therefore, except for a few exceptions like category or advertisement mail or sales channels, most advertisements are combined with other content delivered by the media.

For example, newspapers normally insert advertisement pages with the main content such as news reports and other articles. Television programs broadcast advertisement segments after several minutes of normal program broadcasting. Radio stations broadcast advertisements after several minutes of normal programming. Thus, while readers are reading a newspaper, they will view various ads interspersed with the main content. When a viewer is viewing a television program, in order to view the entire program, the viewer will see the advertisements broadcast during the program. To avoid seeing the advertisements, many viewers switch to another channel whenever the advertisements are shown.

Recently, with the development of the Internet and the World Wide Web, online advertisements have become increasingly popular. Web pages contain many advertisements. For example, almost all portal and news websites include dedicated advertisement blocks in their web pages and advertising space is sold to marketing companies. Advertisements have become an integral part of online content because they are very important sources of revenue.

Advertisements and main content currently coexist side by side. However, to increase the revenue from advertisements, the space dedicated to advertisements is becoming greater and may include an entire page, with the consequence that space dedicated to the main content is decreasing. This often occurs in newspapers where almost half of the newspaper contains dedicated advertisements and the increased size or number of pages does not provide more valuable content to subscribers.

Similarly, the space dedicated to advertisements on web pages is increasing, while the space dedicated to main content in decreasing. This problem is so great that viewers may have to scroll down to skip the spaces occupied by the advertisements. This greatly annoys viewers and also tends to drive viewers to navigate to other sites that contain fewer advertisements. When advertisements become more annoying, they are less readable and effective.

To solve these problems, prior art techniques have been developed including the use of popup advertisements and small moving icons driven by script language displayed on a user's screen. However, these techniques have proven intrusive and advertisement-blocking software has been developed to block those unwanted popup windows and scripts.

Another prior art solution to these problems includes embedding non-intrusive data in main content. For example, U.S. Pat. No. 6,325,420 to Zhang et al. discloses a method for embedding non-intrusive encoded data in printed matter and a system for reading same. Printed matter has printed informational content. This refers to the content of a given document, which is relevant to the intended reviewer, e.g., the printed text of the letter or pictures. According to the invention, the printed matter also, however, comprises a print control symbol. This symbol is located at a predetermined position on the printed matter, which is separated from the printed informational content. The print control symbol is hidden such that it is not apparent to a reviewer of the printed matter and encodes information concerning the printed matter such as sequencing information, which is relevant to the printing system during printing and mailing, for example. The disclosed system and method concerns printed matter and is only used for copy control or copyright tracking. It does not relate to a method of embedding advertisements nor is it related to sideband control.

U.S. Pat. No. 6,463,585 to Hendricks et al. discloses a targeted advertisement using television delivery systems including a multiple channel architecture that is designed to allow targeted advertising directed to television terminals connected to an operations center or a cable headend. Program channels carry television programs. During commercial breaks in the television programs, advertisements, which are also broadcast on the program channel, are displayed. However, additional feeder channels carry alternate advertising that may be better suited for certain viewing audiences. The patent discloses broadcasting advertisement from separate channels with respect to the main content channel. The disclosed systems do not relate to methods for delivering advertisements over a sideband channel to end-users at the same time as the end-users are receiving the main content.

U.S. Pat. No. 6,157,814 to Hymel et al. discloses a wireless subscriber unit and method for presenting advertisements as a message indicator. The unit and method relate to a non-intrusive method for advertising to an end user of wireless subscriber units that provides for multiple viewing hits of the same advertisement and does not relate to display advertisements in sideband channels.

U.S. Patent Application Pub. No. 2004/0015608 to Ellis et al. discloses a method and system for dynamically incorporating advertising content into multimedia environments. Embodiments of the disclosed invention provide computer-based methods and systems for providing a minimally intrusive mechanism that allows a content provider such as an advertiser to dynamically incorporate content, such as advertisements, into a video game or other target communication device or multimedia presentation. Example embodiments provide a dynamic inserter for enabling a player of a video game to experience advertisements incorporated into the game itself. These advertisements are dynamically updated as play progresses and may be incorporated into individual behaviors of objects within the game. The advertisements are not embedded in the content.

U.S. Pat. No. 6,654,725 to Langheinrich et al. discloses a system and method for providing customized advertising on the world wide web. The advertising system has a database server which stores advertisements and their campaign information, and an advertisement server which generates electronic advertisements available to a client system. In the system, a customization process which customizes the electronic advertisements to be delivered to each client system is performed. A user connects to a web site and is presented with an editorial page or a list of search results. The system inserts a customized advertisement into the page that matches the page content or search topic. The customized advertisement is not embedded in the content of the page.

U.S. Pat. No. 6,381,341 to Rhoads discloses a watermark encoding method exploiting biases inherent in the original signal. Where such biases exist, relatively less watermark energy can be applied. The disclosed method does not however relate to the presentation of advertisements in sideband channels.

U.S. Pat. No. 6,879,701 to Rhoads discloses tile-based digital watermarking techniques. A tile-based arrangement is employed to effect watermarking of plural-bit auxiliary data into still or moving digital images. In a particular embodiment, the plural-bit auxiliary data is represented as a rectangular block of overlay data. This block is repetitively tiled, both vertically and horizontally, across the image, and combined with the image data to effect the encoding. The disclosed techniques do not however relate to the presentation of advertisements in sideband channels.

"Steganography And Digital Watermarking" by Jonathan Cummins et al. School of Computer Science, The University of Birmingham. (2004) discusses the history of steganography. Also discussed are digital rights and copyright marking and requirements of hiding information digitally, embedding and detecting a mark, types of steganography, binary file and text file techniques to hide some secret information such as line shift coding protocol, word shift coding protocol, feature coding protocol, feature coding protocol for text content, XML for image techniques such as simple watermarking, LSB—Least Significant Bit Hiding (image hiding), direct cosine transformation or wavelet transformation; sound techniques such as spread spectrum, MIDI, MP3, and other techniques including video and DNA; detections and attacks such as basic attacks, robustness attacks, presentation attacks, interpretation attacks and implementation attacks. The article states that as steganography becomes more widely used in computing, there are issues that need to be resolved. Disclosed are a wide variety of different techniques with their own advantages and disadvantages.

"The Steganographic File System" by Ross Anderson, et al. Information Hiding, Second International Workshop, IH'98, Portland, Oreg., USA, Apr. 15 {17, 1998, Proceedings, LNCS 1525, Springer-Verlag, ISBN 3-540-65386-4, pp. 73 {82 outlines first designs for encrypted file stores with a plausible-deniability mechanism, which are called steganographic file systems. These aim to provide a secure file system where the risk of users being forced to reveal their keys or other private data is diminished by allowing the users to deny believably that any further encrypted data is located on the disk. The paper focus on steganographic file systems that are designed to give a high degree of protection against compulsion to disclose their contents.

"Detecting Steganographic Content on the Internet" by Niels Provos et al. (2001) discusses ways to detect steganographic content. Steganography is used to hide the occurrence of communication. Recent suggestions in US newspapers indicate that terrorists use steganography to communicate in secret with their accomplices. In particular, images on the Internet were mentioned as the communication medium. While the newspaper articles sounded very dire, none substantiated these rumors. To determine whether there is steganographic content on the Internet, this paper presents a detection framework that includes tools to retrieve images from the world wide web and automatically detect whether they might contain steganographic content. To ascertain that hidden messages exist in images, the detection framework includes a distributed; computing framework for launching dictionary attacks hosted on a cluster of loosely coupled workstations. Two million images downloaded from eBay auctions were analyzed and a single hidden message was not found.

There remains a need in the art for a system and method of providing sideband advertising that non-intrusively embeds sideband content into the main content. There is also a need for a system and method of providing sideband advertising that does not require dedicated space for advertising content. There is a further need for a system and method of providing sideband advertising that provides sideband content that is associated with the main content. There is also a need for a system and method of providing sideband advertising that is perceived subconsciously by viewers and listeners of the main content. There is a further need for a system and method of providing sideband advertising that effectively reaches the intended audience.

SUMMARY OF THE INVENTION

The present invention provides a system and method of providing sideband advertising in a non-intrusive manner. Sideband content may be embedded or merged in media content including print media content, online content such as web pages, streaming media content such as radio, television, and video transmissions, and mobile media content.

In accordance with an aspect of the invention, a method of embedding a sideband content in a main content includes the steps of preparing the main content; preparing the sideband content; and merging the sideband content in the main content such that the sideband content is embedded non-intrusively in the main content.

In accordance with another aspect of the invention, a method of embedding a sideband content in a main content includes the steps of preparing the main content; preparing the sideband content, the sideband content being associated with the main content; and merging the sideband content in the main content.

In accordance with yet another aspect of the invention, a system of embedding a sideband content in a main content includes a processor operable to prepare the main content, prepare the sideband content, and merge the sideband content in the main content such that the sideband content is embedded non-intrusively in the main content.

There has been outlined, rather broadly, the more important features of the invention in order that the detailed description thereof that follows may be better understood, and in order that the present contribution to the art may be better appreciated. There are, of course, additional features of the invention that will be described below which will form the subject matter of the claims appended herein.

In this respect, before explaining at least one embodiment of the invention in detail, it is to be understood that the invention is not limited in its application to the details of design and to the arrangement of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and systems for carrying out the several purposes of the present invention. It is important, therefore, that the claims be regarded as including such equivalent methods and systems insofar as they do not depart from the spirit and scope of the present invention.

BRIEF DESCRIPTION OF THE DRAWINGS

The present disclosure may be better understood and its numerous features and advantages made apparent to those skilled in the art by referencing the accompanying drawings wherein:

FIG. 1 is a graphical representation of an embedded watermark in a main content in accordance with the invention;

FIG. 2 is a graphical representation of the letter "I" of the embedded watermark of FIG. 1 in accordance with the invention;

FIG. 4 is a graphical representation of the letter "I" of the embedded image of FIG. 3 in accordance with the invention;

FIG. 5 is a graphical representation of a top portion of the letter "I" of the embedded image of FIG. 3 in accordance with the invention; and FIG. 6 is a flow chart illustrating a method in accordance with the invention.

DETAILED DESCRIPTION OF THE INVENTION

Figure 3:
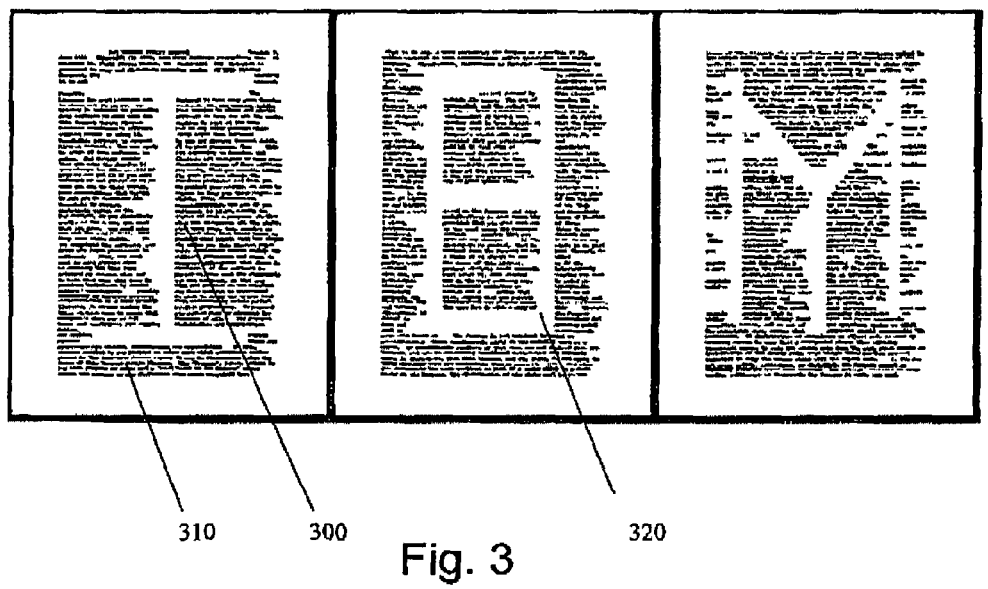
FIG. 3 is a graphical representation of an embedded image formed in the main content in accordance with the invention.

The method of providing sideband content in the main content includes two aspects. A first aspect includes the use of a non-intrusive watermark. A second aspect includes the use of text mosaic or text pattern for text-based media.

Watermarks have found many applications including use on stationery. Most commonly watermarks are used for purposes of authentication. In addition to identifying letterheads, many companies print their logo as a watermark on company stationery and those who receive the stationery can verify the authenticity of the letter by the watermark. Other uses for watermarks include marking other attributes of documents such as confidentiality and sample documents.

The method of the invention does not contemplate putting the watermark sideband content into the background of the main content. Such an approach may be annoying and intrusive to the viewer. Viewers may get bored or disgusted with the watermark sideband content and may even disguise the contents. The purpose of the watermark sideband content in accordance with the invention is to let the viewer focus on the main content being viewed and only unconsciously or subconsciously discover the watermark sideband content in the background, or in the sideband of the main channel being viewed.

The method of the invention, generally designated 600 (FIG. 6), includes a step 610 in which the main content is prepared. In a step 620, a sideband content such as an advertising element including a brand name, a company name or a slogan is selected and prepared for merging and embedding in the main content. The preparation of the selected sideband content may include enlarging the sideband content to a predetermined size so that the enlarged sideband content covers multiple paragraphs or a whole page. For example, the font of the letters may be greater than 100 points so that in a whole page, there will be very few letters. In this way, the viewer will be able to ignore the sideband content while he is reading the main contents as only small part of sideband content is presented and, as such, is barely distinguishable from meaningless background noise. Only after finishing all the main content, will the sideband content be perceived unintentionally in an whole. In a step 630, the sideband content is non-intrusively merged in the main content. Non-intrusively implies that while viewers are focusing on the main content, the sideband content is negligible or ignorable.

Additionally, the complexity of the sideband content may be reduced by eliminating colors to provide simple words or logos or pictures. For example, a plain text name like IBM or SUN's logo would be sufficient to advertise for IBM or SUN. The colors can be changed to match the background. For example, in the case of a newspaper, the color might be something just a little grayer than the background white, such an off white. The purpose is to obscure the sideband content from the viewer unless the viewer pays close attention to the sideband content.

With reference to FIG. 1, a watermark sideband content 100 is shown including the letters "IBM". The watermark sideband content 100 is shown under-imposed in the main content 110. As shown, the letters "IBM" comprising the sideband content 100 are hardly visible, and as such are non-intrusive. As the viewer focuses on individual paragraphs of the main content 110, the whole of the sideband content 100 may not be appreciated by the viewer.

With particular reference to FIG. 2, the first letter 200 of the watermark sideband content 100 is shown including the letter "I" under-imposed in paragraph 210. As the viewer reads over several paragraphs of the main content 110 and starts to browse the whole page of the newspaper, the viewer may notice the existence of watermark sideband content 100. In this way, the watermark sideband content 100 may come into focus to the viewer when the viewer looks at the whole page. However, the viewer may continue to read the main content 110 in the newspaper without paying particular attention to the watermark sideband content 100 and only be aware of the sideband content 100 subconsciously. When the sideband content is associated with the main content, it is easier for the viewer to perceive and recognize the sideband content naturally.

Accordingly, the method of providing sideband advertising in accordance with the invention allows the advertisement in the watermark sideband content 100 to coexist with the main content 110 without the need for dedicated advertising space. Of course, regular ads with dedicated page space can still co-exist with watermark sideband content. For example, regular advertisements can show details related to, or associated with, the sideband content 100.

According to a second aspect of the invention, sideband content within text-based main content is presented as text mosaic or text patterns. In the first step 610, the main content, including articles and other textual information is prepared to be delivered to the viewer, including the determination of font sizes, font color, and page layout. In the step 620, the sideband content, such as a company name or logo, is prepared, for example, by determining the size of the sideband content relative to the size of the main content, by determining the position of the sideband content relative to the main content, by determining number of colors used relative to colors of the main content, and how the sideband content will be represented in the main content. The sideband content may be represented as different text sizes, fonts, colors or other text attributes. In the step 630, the sideband content is non-intrusively merged in the main content.

Figure 4:
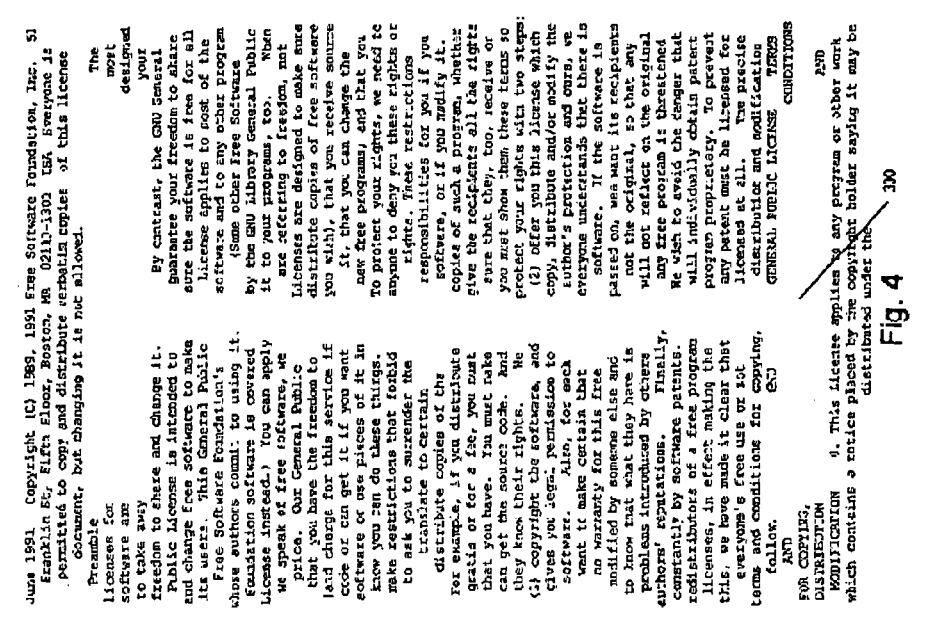

An exemplary sideband content 300 embedded in a main content 320 is shown in FIG. 3 utilizing spaces between words and lines as the text pattern. The sideband content 300 may be sized and rendered as spaces 310 within the main content 320 so that the sideband content 300 occupies a whole page as shown in FIG. 3 and FIG. 4 (showing the letter "I" of the company name "IBM"). It is noted that the sideband content 300 is shown larger than it would be in use for purposes of illustration only. The viewer may only be aware of a small portion of the sideband content 300 while the viewer is reading the main content 320 without being disturbed by the spaces comprising the sideband content 300 in the background. The sideband content 300 can be made natural and only barely visible when the viewer, is viewing the whole page from far away as shown in FIG. 4.

The company name "IBM" may be spread across multiple pages of the main content 320. When a viewer reads the main content 320 from page to page, the viewer is presented with letters "I" and then "B" and then "M" to form the IBM brand name. This ability to convey ads subconsciously is one of the advantages of the sideband method when the method of the invention is used in the advertising context, and even more effectively when the sideband content has strong association with the main content, such as in this case, the main content is related to the personal computer industry and the sideband content relates to IBM The method of the invention is different from traditional image mosaic where smaller pictures are used to present a much bigger image, and is also different from traditional text composing games where different letters are used to compose a much bigger text signature or tattoo. The text pattern of the method of the invention is part of a complete meaningful article; it may comprise the spaces among the words of the main text that shows the sideband message in a much larger scale. The scale may be large enough so it is not visible or intrusive when readers are reading only one or two paragraphs in a smaller scale. In one embodiment, the method of the invention embeds a sideband content inside the main text as a text (or space) pattern to provide non-intrusive advertisements to viewers.

In addition to using spaces as text pattern to represent the sideband content, the main content text may alternatively be used to form a kind of text pattern to represent the sideband content. To achieve this, the sideband content may be enlarged on top of the page layout so that it covers the majority of the spaces and then the main content text is poured into these areas. Now, it is the main content text itself that shows the sideband content.

The text pattern method can also use different line spaces, word fonts, typefaces, colors, punctuation marks, and other text attributes to represent the sideband content, as long as it does not disrupt the viewers' reading of the main content. The term "sideband" is used in reference to the sideband content because the main content is used to deliver main information and the sideband content exists within the main content and only utilizes a small bandwidth compared to the main content bandwidth.

The text mosaic method also has another usage. The mosaic text, or sideband message can be used to authenticate the origin of the article or text message as it carries some information not directly visible in the main content. Basically, the embedded sideband information is also not easily removed by simple copy/paste operations unless people re-organize the text by removing all extra spaces or other text attributes from the main text.

For example, a programmer can sign his code by applying a sort of signature pattern on top of his existing code. A certain type of text font, additional spaces, empty lines or comments can be inserted into the main code without changing its functionality. In this way, the code text itself now carries the additional sideband information from the author. In the future, anybody who copies and pastes large amount of this code without major cleanup or re-writing can be discovered simply by looking at the textual pattern using the font type and faces by which the programmer embedded the signature from a larger scale of view.

More than one sideband content can be embedded or merged in the main content; such as a single article. This can be achieved by laying out multiple patterns in different spaces that coexist, or by rendering different sideband content in different text attributes: one using spaces while another one using texts, fonts, or colors. It is also possible that the scales by which the sideband content is presented can be made recursive. This means, if we view the message from a larger scale (farther away or view more texts all at a time), a different text pattern may show up. This could be achieved by putting several layers of layout in different scales and render the main content text from the bottom up. For example, in a 48-inch by 48-inch newspaper page, each individual page (10 inch by 10 inch) could be rendered with messages such as IBM, but when looked at from a top layer (48"×48") the logo of SUN would be visible.

In the case of online media such as web pages, the sideband content may occupy the whole web page in the background in a color or be embedded in the main content using text patterns. The sideband content may be barely visible and only be noticeable when the user browses the whole page. While the reader is reading a single paragraph of the page, sentence by sentence, the reader may not notice that the sideband content is in the background. Thus the reader won't experience being forced to read the sideband content. However, as the reader reads, the reader gets a fraction of the background sideband content from time to time and his brain may combine those fractions together later. In other words, the reader might not notice that he has already received such sideband content subconsciously.

In the online world, web designers can also split the sideband content into multiple pages linked from one to another. The sideband content could be associated with the main content so it is easier for users to connect them together. As long as viewers click those links one by one, they will automatically receive the underlying ads while visiting those contents in sequence.

Online media such as web sites or web pages have an additional advantage over traditional media, namely interactivity and real-time presentation of content. The sideband content merged in the main content of a web page can dynamically change as time goes by. For example, when the sideband content includes the image "IBM" on a web page, the sideband content could first be the letter "I" for a first minute, the letter "B" for a second minute, and the letter "M" for a third minute. The display can cycle automatically without the reader's knowledge, as long as the browser can change the sideband content without refreshing the whole web page or noticeably interrupting the web page as presented to the viewer. This technically can be achieved by DHTML, script or plug-ins embedded in the web pages. In this way, even while the viewer is spending a lot of time viewing only one web page, the viewer may be presented with multiple advertisements or different parts of one advertisement running non-intrusively in the background without the viewers' knowledge. Changes in the sideband content can also include changes in the shape, color, size or any other attributes of the sideband content. Additionally, a first sideband content could morph into a second sideband content while the viewer is viewing the main content.

The method of the invention utilizes the fact that the human brain can retain information subconsciously, as information perceived by the eyes, ears or other sense organs. Some of the information may automatically be filtered out by the brain if it does not match what the viewer is currently doing, however the brain may still retain an impression. This method is most effective when the sideband content has association with the main content.

In general, the methods disclosed herein provide a means of embedding sideband content such as advertising messages inside the text based main content including messages, articles, and papers in a non-intrusive manner so that viewers do not feel that they are forced to read or perceive the contents of the advertisements. In accordance with the invention, the sideband content such as advertisements are still delivered and presented to readers as long as they are reading the main content. The embedded advertisement can be regarded as a kind of sideband channel with respect to the main channel that is used to deliver main content or normal messages to readers. The sideband content may not be visible to readers or noticeably annoying to them as long as they are reading the main content or messages because when they are reading small paragraphs of the information they can only see a small portion of the sideband content. However, when the viewer finishes reading the whole message or article, the sideband content is subconsciously received and absorbed by the viewers' eyes and brain. In this way, the viewer will not feel that the advertisement is offensive or intrusive.

The methods of the invention can also be applied to streaming media such as radio programs. For radio programs, the sideband content can be embedded as a kind of background music that has very low volume and is barely audible by the audience. The sideband content, in the form of background sounds, may be comprised of some repetitive words such as a company's brand name like CocaCola® or some other product names in the music. This "advertising noise" in the background can also be broadcast when the main program is broadcasting other news stories or programs. Since the sound is barely audible, the listeners may not notice that the background noise even exists, but the ear and brain pick them up automatically. And with the repetitive broadcasting of such sideband messages, the subconsciously heard messages such as brand names in the background may eventually be recognized and remembered by the listener's brain, and the listener may pay more attention to that kind of brand name unintentionally or subconsciously.

For radio or audio programs, by taking advantage of characteristics of human perception, it is possible to embed advertisements within a file without much difficulty or by distorting the original media clips. For example, audio file frequency masking occurs when two tones with similar frequencies are played at the same time so that the listener only hears the louder tone while the quieter one is masked. Similarly, temporal masking occurs when a low-level signal occurs immediately before or after a stronger one as it takes us time to adjust to the hearing the new frequency. This provides a clear point in the file in which to embed advertisements without distorting the original files. In this way the embedded advertisement messages can utilize the human perception to embed more information into the main content channel.

Furthermore, the added sideband content, including advertising messages may be related to, or associated with, the main content. For example, when the main content is about food, the sideband content may relate to a food company and when the main content is about software, the sideband content may be related to a new software product. In this way, the sideband content advertisement may be tailored and be related to the main content.

The method of the invention may also be utilized in embedded or mobile systems. For example, in an open page of a mobile telephone, a sideband content can be displayed showing a brand name of a promoting company. Other embedded devices include handheld devices, PDAs and other mobile devices having an interface that deliver main contents to users.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and their equivalents.

I claim:

1. A method of embedding a sideband content in a main content comprising the steps of:
   preparing the main content;
   preparing the sideband content comprising a pattern;
   creating a template within the main content without removing or covering the main content;
   laying out the sideband content to the template within the main content by modifying a layout of the main content such that the sideband content comprising the pattern is unnoticeable while a user is viewing said main content within a display in a smaller scale and becomes noticeable only when the user zooms to a larger scale; modifying an existing layout of the main content comprising resizing and reflowing the main content around the sideband content; and
wherein the sideband content changes dynamically without refreshing or removing the main content.

2. The method of claim 1, wherein the template comprises a text pattern.

3. The method of claim 1, wherein the sideband content is associated with the main content.

4. The method of claim 1, wherein the modifying the layout of the main content comprising modifying an appearance or visual attributes of the main content.

5. The method of claim 1, wherein the sideband content comprises an author signature or an advertisement.

6. The method of claim 1, wherein sideband content spans across multiple pages of the main content, each page containing a fraction of sideband content.

7. The method of claim 1, wherein multiple sideband content coexists within the main content by laying out different sideband contents to different templates.

8. A method of embedding a sideband content in a main content comprising the steps of:
   preparing the main content for reading in a smaller scale;
   preparing the sideband content for viewing in a larger scale;
   merging the sideband content to a comprising a pattern into the main content in such a way that the main content is initially displayed in smaller scale to enable reading of text of the main content and the sideband content comprising the pattern becomes noticeable only when a user scales out and is unnoticeable while the user is viewing said main content in a smaller scale;
modifying an existing layout of the main content comprising resizing and reflowing the main content around the sideband content; and wherein the sideband content changes dynamically without refreshing or removing the main content.

9. The method of claim 8, wherein said pattern is formed by modifying the existing layout of the main content.

10. The method of claim 9, wherein the modifying the existing layout comprises changing text attributes of the main content.

11. The method of claim 8, wherein the pattern is formed by sideband content merged within the main content.

12. The method of claim 11, wherein the sideband content comprises text select from among space, empty lines or comments.

13. The method of claim 8, wherein the sideband content changes dynamically without a viewer's knowledge.

14. The method of claim 8, wherein multiple sideband content coexists within the main content by laying out different sideband contents using different patterns or visual attributes.

15. The method of claim 8, further comprising: while the main content is displayed in a smaller scale and being read by the user, the sideband content is morphed into a second sideband content in a background.

16. A system of embedding a sideband content in a main content comprising:
    a processor operable to prepare the main content for reading in a smaller scale, prepare the sideband content for viewing in a larger scale, and merging the sideband content comprising a pattern into the main content in such a way that the main content is initially displayed in a smaller scale to enable reading of text of the main content and the sideband content comprising the pattern becomes noticeable only when a user scales out and is unnoticeable while the user is viewing said main content in a smaller scale;

modifying an existing layout of the main content comprising resizing and reflowing the main content around the sideband content; and wherein the sideband content changes dynamically without refreshing or removing the main content.

17. The system of claim 16, wherein the sideband content is a media content.

18. The system of claim 16, wherein the processor is running in a mobile device.

\* \* \* \* \*